Patented Feb. 28, 1939

2,148,554

UNITED STATES PATENT OFFICE 2,148,554

ADHESIVE

Winfrid Hentrich, Dusseldorf-Reisholz, and Rudolf Köhler and Fritz Schlegel, Dusseldorf, Germany, assignors to Henkel & Cie. G. m. b. H., Dusseldorf-Halthausen, Germany, a corporation of Germany No Drawing. Application March 24, 1937, Serial No. 132,769. In Germany April 3, 1936

4 Claims. (Cl. 134—23.1)

This invention relates to new adhesives and to new adhesive bases which may be dissolved in water to produce these adhesives.

Among the objects of the invention are to provide improved adhesives of high cementing power which are resistant to micro-organisms and need not be combined with a preservation agent, and which possess improved qualities enabling them to be used for many purposes.

Other objects are to provide adhesive bases, i. e., substances forming adhesives when dissolved, which may be marketed in solid form and converted into desirable adhesives simply by dissolving them in water, and to provide such bases which form suitable adhesives when dissolved in relatively large quantities of water.

We have found that improved adhesive bases and adhesives may be obtained from the water soluble polysaccharide ether sulfonic acids, such as cellulose ether sulfonic acids, starch ether sulfonic acids and their salts and derivative. These compounds and methods for preparing them have been known heretofore, but it has not been known that they possess qualities rendering them very valuable for the preparation of adhesives. See for example, Austrian Patent No. 117,056 and French Patent No. 715,585 for disclosures of methods of preparing such compounds.

The new adhesives of our invention may be used to advantage instead of other known adhesives, and for the many purposes to which adhesives are adapted. For example, they are valuable in the manufacture of cartons, for the cementing or binding of paper, for all the adhesive uses in the bookbinding industry and for paperhanging. Furthermore, we have found that their properties equip them for important uses as dye binding agents, for example, as so-called painters' size to be employed in coating the interior walls of a room.

The water soluble polysaccharide derivatives which are the principal constituent of the improved adhesives and adhesive bases are designated generally herein as soluble polysaccharide ether sulfonic acid compounds. As the preferred group of compounds we employ water soluble derivatives, for example, the salts, such as sodium, potassium, ammonium, or triethanol amine salts, or other water soluble derivatives, such as amides, of polysaccharide ether sulfonic acids produced by the etherization of cellulose with substances of the type represented by the following:

Beta-hydroxy-ethane-alpha-sulfonic acid,
Beta, gamma-di-hydroxypropane-alpha-sulfonic acid,
Benzyl alcohol-para-sulfonic acid,
Glycolic acid-[methyl-(beta-sulfonic acid-ethyl)-amide], and
Beta-[beta'-sulfo-ethoxy]-ethyl alcohol.

Polysaccharide ether sulfonic acid compounds in which the carbon chain containing the sulfonic acid radical is broken up one or more times by the interlinkage of an oxygen, sulfur or nitrogen atom are also suitable. In addition, compounds containing both a sulfonic acid group and a group such as an alkyl or hydroxy alkyl group, and compounds derived from degraded cellulose may be used advantageously.

In another embodiment of the invention adhesives and adhesive bases are produced from the soluble analogues of starch-ether sulfonic acids, or from soluble polysaccharide-ether sulfonic acid compounds derived from modified starches, such as dextrine.

We may prepare the improved adhesive bases and adhesives in any of several ways. In one procedure the base is prepared by preparing the constituent polysaccharide-ether sulfonic acid compound in the form of a paste, and it is offered to the trade in this form so that the user may dilute the paste to any desired degree and obtain an efficient adhesive. In another procedure the base is prepared in the form of a powder. Due to its solubility in cold water, adhesives may be obtained from this powder simply by introducing it into unheated water. In still another procedure the adhesive may be prepared directly by dissolving the constituent compound in water.

The new adhesives and adhesive bases may consist entirely, or only in part, of polysaccharide-ether sulfonic acid compounds. Desirable results are obtained by using them in admixture with known adhesive materials such as starch paste, casein adhesive and animal glue, although we prefer to use them alone. If necessary they may contain other constituents, such as penetrating agents and the like.

The adhesives of our invention, particularly those prepared from cellulose-ether sulfonic acid compounds, possess unusually high viscosities and cementing qualities, even in greatly diluted solutions. Moreover, they are superior to known adhesives because of their ability to bind water and their efficiency; and their stability in the presence of micro-organisms makes it unnecessary to add preservation agents.

Example

One part by weight of the sodium salt of beta-sulfonic acid ethyl cellulose is dissolved in 30 parts of cold water. A strongly adhesive paste which is suitable for paperhanging is obtained.

While we have described the invention by referring to particular compounds we intend that it extend to equivalent compounds and that it be not restricted except as required by a fair interpretation of the claims.

We claim:

1. An adhesive comprising an aqueous colloidal solution containing less than 8% by weight of a water-soluble polysaccharide-ether sulfonic acid compound.

2. An adhesive comprising an aqueous colloidal solution containing less than 8% by weight of a water-soluble cellulose-ether sulfonic acid compound.

3. An adhesive comprising an aqueous colloidal solution containing less than 8% by weight of a water-soluble starch-ether sulfonic acid compound.

4. The method of producing improved adhesives which comprises preparing water-soluble polysaccharide-ether sulfonic acid compound in finely divided form and introducing the finely divided material into unheated water to obtain a colloidal adhesive solution containing less than 8% by weight of the compound.

WINFRID HENTRICH.
RUDOLF KÖHLER.
FRITZ SCHLEGEL.